United States Patent
Furuichi et al.

(10) Patent No.: US 8,347,346 B2
(45) Date of Patent: Jan. 1, 2013

(54) MANAGEMENT OF MANDATORY ACCESS CONTROL FOR GRAPHICAL USER INTERFACE APPLICATIONS

(75) Inventors: Sanehiro Furuichi, Tokyo (JP); Atsumi Ikebe, Kawasaki (JP); Takuya Mishina, Yamato (JP); Masami Tada, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 1133 days.

(21) Appl. No.: 11/755,769

(22) Filed: May 31, 2007

(65) Prior Publication Data
US 2008/0301754 A1 Dec. 4, 2008

(51) Int. Cl.
*G06F 17/00* (2006.01)
*H04L 29/06* (2006.01)
*G06F 17/30* (2006.01)
*G06F 7/04* (2006.01)
*G06F 3/00* (2006.01)

(52) U.S. Cl. ................... 726/1; 726/2; 715/700
(58) Field of Classification Search .............. 726/1–6, 726/16–19; 715/700, 810
See application file for complete search history.

(56) References Cited

U.S. PATENT DOCUMENTS

| | | | | |
|---|---|---|---|---|
| 5,625,783 A * | 4/1997 | Ezekiel et al. | ............... | 719/320 |
| 5,844,553 A * | 12/1998 | Hao et al. | ............... | 715/733 |
| 2002/0140738 A1* | 10/2002 | West et al. | ............... | 345/810 |
| 2003/0058286 A1* | 3/2003 | Dando | ............... | 345/853 |

* cited by examiner

*Primary Examiner* — Yin-Chen Shaw
*Assistant Examiner* — Jahangir Kabir
(74) *Attorney, Agent, or Firm* — Lieberman & Brandsdorfer, LLC (57) ABSTRACT

Granular policy management is provided based upon an active status of a process and the display status of an associated visual display. A policy is constructed and applied to a process by a combination of individual control policy parameters associated with the status of a process or a graphical user interface. Each active policy is dynamically adjusted in response to a change in at least one policy condition.

20 Claims, 5 Drawing Sheets

MANAGEMENT OF MANDATORY ACCESS CONTROL FOR GRAPHICAL USER INTERFACE APPLICATIONS

BACKGROUND OF THE INVENTION

1. Technical Field

The present invention relates to a control method of an application program and an apparatus therefor. More particularly, the present invention relates to a control method for controlling a function call from an application program to an operating system and an apparatus therefor.

2. Description of the Prior Art

Recently, there has been an increase in theft of security information stolen by an authorized user, or a person with such access. It is known in the art to require user accounts and associated passwords to such accounts to control access of specific user to data. One prior art control technique known is mandatory access control, which limits the authority of access control to an administrator. Even if a process has a right to access an object, the process will only be granted the requested access if the process holds an access right thereto. Examples of known mandatory access control techniques include SELinux, AppArmor, and TOMOYO Linux. The mandatory access control techniques enforce access control to a resource by modifying the kernel of an operating system, using the mechanism of kernel hooks, or modifying an application. Other access control policies monitor API calls and controls the behavior of processes based on a previously defined policy. This eliminates the need to modify an application or operating system while ensuring a comprehensive mandatory access control.

Conventional operating systems control operation of an application program based on information set by a system administrator. For example, the operating system inhibits or enables access to a specific file according to the authority of a user who activates the application program. While the above-mentioned prior art technique addresses a specific control policy for a specific process or program, the prior art does not address a control policy on a running process. Security management is dynamic and access to a process or program may change in an on-going manner on a running application. Furthermore, it is known in the art for large scale application to employ a multiple document interface (MDI) system to simultaneously display multiple documents within the same process. Prior art applications employ a process-by-process mandatory access control policy where it is natural to apply an access control policy on a document by document basis. The prior art applications cannot change a policy even if a document to be edited by a user is changed. The prior art application can only apply one fixed policy to all documents in a single process.

As discussed above, the prior art solutions to implementation and enforcement of control policies are limited to control based on a process. In association with a command line interface, the prior art enforcement of control policies was acceptable. However, in recent years the command line interface has been sidelined by the graphical user interface. Therefore, there is a need for a policy management scheme that is adapted to a graphical user interface environment and applications that operate within a graphical user interface environment.

SUMMARY OF THE INVENTION

This invention comprises a method and system for management of resources and associated policies.

In one aspect, a method is provided for dynamic resource access. A computer system is configured with a processor and memory in communication with a policy manager. The policy manager evaluates a new control policy for a process to be executed within the computer system to determine consistency of the new policy with an existing policy. A workable access control policy is detected for the process by monitoring activation and termination of processes from all running applications. The new control policy is registered with the policy manager in response to the evaluation and the detection of the workable control policy to determine if the control policy being registered is consistent with an existing and registered control policy. At least one of the policies is classified based upon a policy application condition. Each policy parameter is adjusted in real-time in response to a change in at least one policy condition.

In another aspect of the invention, a computer system is provided with a processor in communication with memory and a policy manager. The policy manager evaluates a new control policy for a process for execution thereof. The evaluation includes a determination of consistency of the new policy with existing policies. A process manager in communication with the policy manager monitors activation and termination of processes from all running application to detect a workable access control policy for the process. The process manager registers the new control policy with the policy manager responsive to the evaluation and detection of the workable control policy and determination of consistency of the control policy being registered with an existing and registered control policy. The policy manager classifies at least one of the policies based upon a policy application condition. In addition, the policy manager adjusts each policy parameter in real-time in response to a change in at least one policy condition.

In yet another aspect of the invention, an article is provided with a computer readable medium having computer-readable instructions stored thereon executable by a processor. The instructions include instructions to evaluate a new control policy for a process to be executed within a computer system to determine consistency of the new policy with an existing policy. In addition, instructions are provided to detect a workable access control policy for the process by monitoring activation and termination of processes from all running applications. Instructions to register the new control policy with the policy manager are provided in response to the evaluation and detection of the workable control policy determining that the control policy being registered is consistent with an existing and registered control policy. In addition, instructions are provided to classify at least one of the policies based upon a policy application condition, and to adjust each policy parameter in real-time in response to a change in at least one policy condition.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

The present invention attains granular management of a process operating within the confines of a graphical user interface. More specifically, the invention relates to management of the process within the interface based on an active status of the process and a display status of a window. A policy is constructed and applied to one process by individual control policy parameters associated with the status of the process.

Technical Details

A policy manager is provided to execute centralized management policies of the system for individual processes which are running on the system. In addition, the policy manager performs registration and deletion of a policy. At the time of registration of a policy, the policy manager evaluates the consistency of the policy to be registered with any current registered policies. The policy manager may permit or deny the registration of the policy.

The policy manager is in communication with a process monitor, a window monitor, and an access controller. The process monitor monitors activation and termination of processes. The window monitor monitors a change in the status of a window. Examples of a change in a window status include, but are not limited to, creation, deletion, movement, resizing, z-order change, and activation of a window or non-activation of a window within a process of a graphical user interface application. The policy manager updates the policy based upon the monitored result. More specifically, the policy manager re-evaluates the policy's application condition based on monitoring results from the process monitor and the window monitor. The policy manager updates the access control policy by dynamically adding or subtracting the policy elements of a target process. The policies of all the processes which are influenced are updated at the same time. In addition, an access controller is provided in communication with the policy manager to control resource access by each process based on a policy.

Access control policy data is exchanged among the above process elements and an external process. Access control policy data is constructed by combining policy elements individually designated for each application target and each application condition. The application target is an instance of a program to which a policy is applied. Examples of an application target include, but are not limited to, a local process, a specific process, or other processes. The application condition is an active status of a program. Examples of an application condition include, but are not limited to, a process being active, a window being displayed, or a window being active. Every time the application condition changes, policies to be applied to individual processes are dynamically reconstructed according to the status of the associated program.

There are two categories of access control policies based on the management subject, a system policy and a user policy. The system policy is a fixed access control policy for security as a default setting. It is set on a per program basis on the absolute path of the program. The system policy is equivalent to a conventional mandatory access control policy which limits the right to access a specific folder to a specific program. An administrator mandates application of the system policy. The user policy is a volatile policy for each process to be generated. The user policy is registered by an application as needed according to use and is applied to each process by being appended to the system policy. In effect, the user policy supplements the system policy.

There are three categories of policy parameters which are designated by a user policy. The categories are based upon the target application. The three categories are as follows, a local policy parameter, a remote policy parameter, and a global policy parameter. The local policy parameter is an access control policy parameter for a program or process to which a policy is to be applied. The remote policy parameter is an access control policy parameter which is selectively added and applied to a specific process or a plurality of other processes while the local policy parameter is valid. The global policy parameter is an access control policy parameter which is selectively added and applied to all other active processes while the local policy parameter is valid.

A system policy or a user policy can be individually designated according to a condition which activates the policy to be applied. There are various condition which may activate the policy. For example, a condition may be a process condition in which a policy is applied when a process is activated. Similarly, a policy may be canceled when the process is terminated. Another condition may be a window condition in which a policy is applied when a window is created. This policy or classification of the policy may similarly be canceled when the window is closed or removed. In one embodiment, the window condition may apply to a invisible window. For example, in a multiple document interface (MDI) application where one window corresponds to one document, the open or close event of a document may be used as a condition in place of a window. Other conditions that may activate a policy include a visible window or an active window. A visible window policy is applied while all or some regions of a window are displayed, and the policy is similarly canceled when the window is minimized or otherwise becomes non-visible. An active window policy may be applied while a window is active and the policy is similarly canceled when the window becomes inactive.

Figure 1:
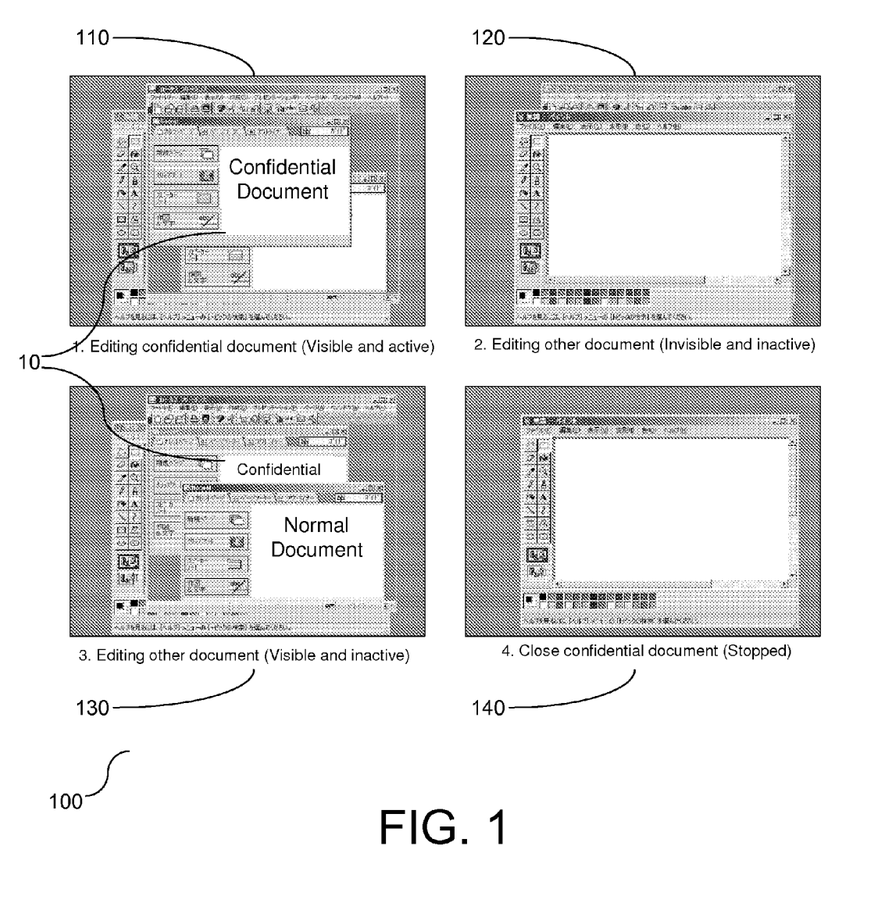
FIG. 1 is a block diagram illustrating categories of graphical user interface statuses.

As explained above, an adequate policy can be applied according to the transition of the status of a window on a graphical user interface by individually setting policy parameters for each application target or application condition, and dynamically adding or substituting the policy parameters. In one example, there are four categories of graphical user interface statuses. FIG. 1 is a block diagram (100) illustrating categories of graphical user interface statuses. In the example shown herein, a document titled "Confidential Document" is displayed on a window. One category (110) associated with the document (10) is editing of a soft copy of the document in which a user may make changes to the document (10). As shown at (110) the document (10) is visible and active within a window. A second category (120) is when the document (10) is invisible and inactive. In one embodiment, the window housing document (10) may be hidden behind one or more other windows while another document in another window is active. A third category (130) is when the document (10) is visible and inactive within a window. In one embodiment, all or some of the regions of the window housing document (10) are displayed. A fourth category (140) is when the document (10) has been closed. In one embodiment, a program associated with the document (10) may have been terminated. Accordingly, FIG. 1 is an example of categorizing the available status of a document within a window.

Figure 2:
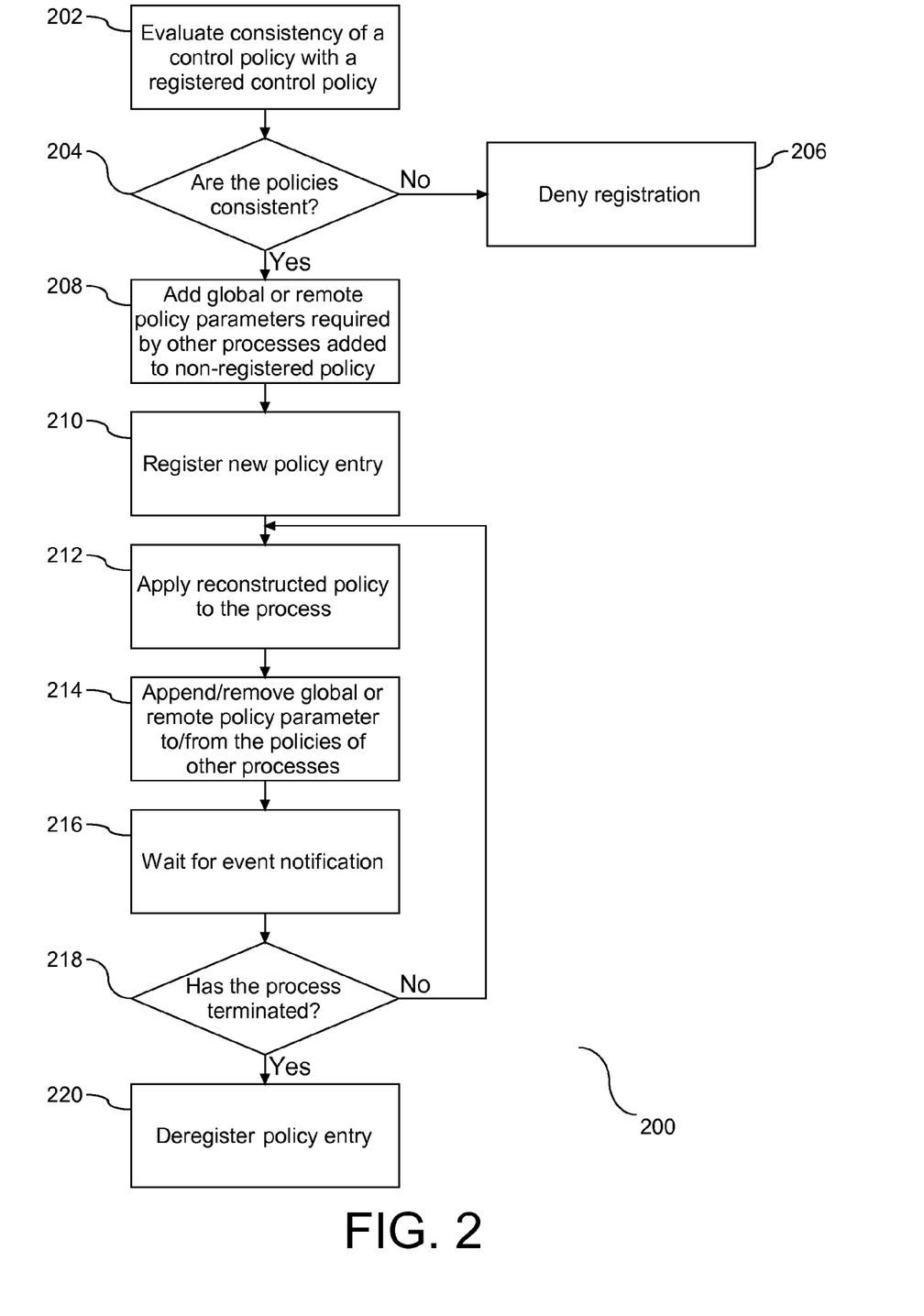
FIG. 2 is a flow chart illustrating a process for registration and application of a control policy with a policy manager.

FIG. 1 is an example of a policy applied to the status of a window in a graphical user interface. Control policies may be modified. Similarly, new control policies may be registered with the policy manager. FIG. 2 is a flow chart (200) illustrating a process for registration and application of a control policy with the policy manager. The consistency of the control policy to be registered is evaluated with respect to an existing and registered control policy (202). A determination is then conducted as to whether the control policy to be registered, i.e. non-registered policy, is consistent with the currently registered control policy(s) (204). If the response to the determination is negative, the registration is denied (206). Conversely, if the response to the determination is positive, the global or remote policy parameters required by other processes are added to the non-registered policy (208), and the non-registered policy is registered with the policy manager (210). Following the registration, the local policies of the policy registered at step (210) are applied to a main target process with which the policy is associated (212), and the global or remote policies of the policy registered at step (210) are added and applied to other processes (214). In one embodiment, the local policy parameter of the policy is applied to this main process, while global or remote policy parameters of the policy are appended to other processes. When the main process terminates, the global or remote parameters will be subtracted. The policy manager waits for event notification (216), and analyzes whether the event is a process termination (218). If the determination is positive, the policy entry is de-registered (220). If the determination is negative, policies are reconstructed as a condition as illustrated by a return to steps (212, 214). Accordingly, the process for registering a new policy requires consistency with previously registered policies with the policy manager.

In one embodiment, a parent process, $P_p$, i.e. a process registered with the policy manager, may activate a child process, $P_c$, with a new policy that is not registered with the policy manager. As shown in FIG. 2, the first part of the registration process is the evaluation of the child process, $P_c$. A new policy is registered after its consistency with existing policies that are registered with the policy manager are evaluated. When another process, $P_n$, which is already active inhibits access to a confidential document by an arbitrary process, the child process, $P_c$, cannot be activated with full access to the confidential document being allowed. The second part of the registration process is the construction of a policy. The child process, $P_c$, first inherits a policy $p_p$ of the parent process $P_p$. The child process, $P_c$, adds global and remote policy parameters requested by other processes which are already active. A policy $p_c$ to be applied to the child process is defined as follows:

$$p_c = p_p + p_{L_c} + \sum_{i=1}^{N} p_{G_i} + \sum_{i=1}^{N} p_{R_i}$$

where, $p_{Lc}$ is a local policy parameter to be applied to the child process, $p_{Gi}$ is a global policy parameter requested by a process $P_i$, $p_{Ri}$ is a remote policy parameter requested by the process $P_i$, and N is the number of active processes. When the global policy parameter or the remote policy parameter is not designated, the value becomes null. In this example, addition is the union of a restriction policy or an allowed policy. For example, if $p_i$ is a policy to disable writing to a file located in a temporary directory on storage media, and $p_j$ is a policy to disable writing to a file located in a non-temporary directory on storage media directory, the $p_i+p_j$ is a policy to disable writing to either file in either the temporary directory on storage media or the non-temporary directory on storage media. Individual policy parameters, p, are functions of an application condition, and are expressed as follows:

$$p(c)=p(c_1)+p(c_2)+ \ldots +p(c_n)$$

where $p(c_n)$ is a policy parameter to be applied when the application condition $c_n$ is satisfied, and is abandoned when the application condition is not satisfied.

The third part of the registration process is applying the recently registered policy with other processes. While the application condition is satisfied, a policy in the form of either a global policy parameter, $p_{Gc}$, or a remote policy parameter, $p_{Rc}$, designating other processes as application targets is added to policies of other processes which are already active. The fourth part of the registration process is policy reconstruction. When the condition $c_n$ is not satisfied, such as when a process is terminated or a window becomes inactive, a policy $p(c_n)$ is removed. More specifically, the policy is changed as follows:

$$p_i=p_i-p(c_n)$$

This reconstruction process is performed for the process $P_c$ and all the processes that are influenced by the condition $c_n$. Restriction on the other processes which have been applied while the process, Pc, is running is automatically canceled at the same time as the process $P_c$ is terminated. Policy data which becomes unnecessary in relation to the process termination is discarded.

Figure 3:
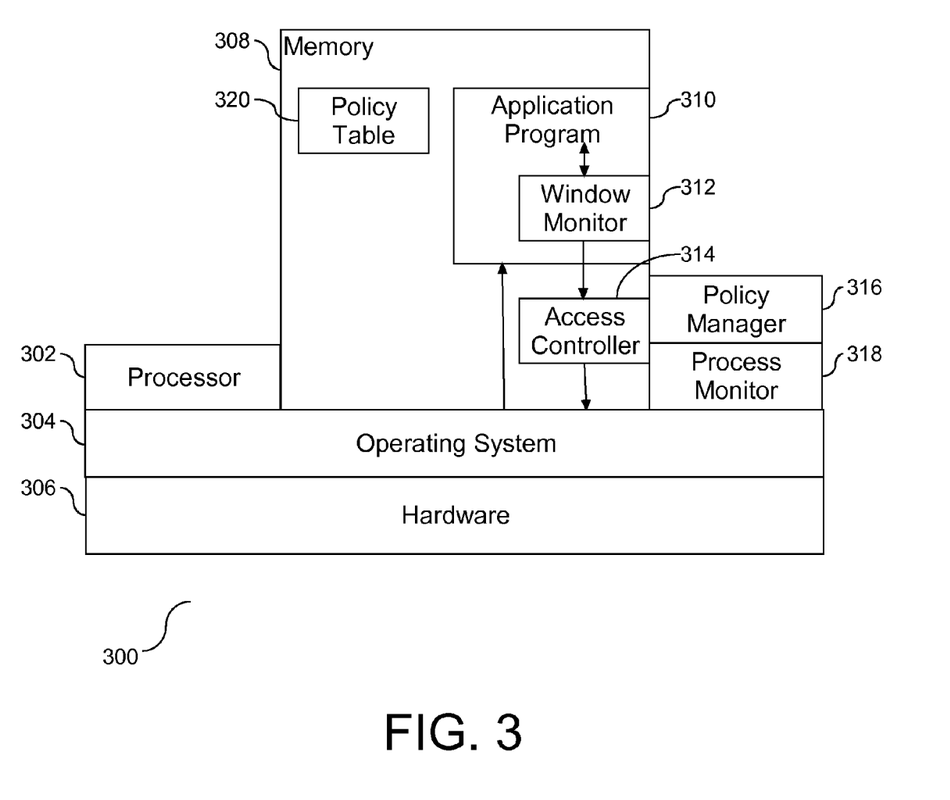
FIG. 3 is a block diagram of a computer system configured to manage access control based on a document according to the preferred embodiment of this invention, and is suggested for printing on the first page of the issued patent.

FIG. 3 is a block diagram (300) of a computer system configured to manage access control based on a document by document policy for an MDI application. The computer system is shown with a processor (302) in communication with an operating system (304), system hardware (306), and memory (308). An application program (310), window monitor (312) and access controller (314) reside in memory (308) and are in communication with the operating system. Similarly, the policy manager (316) and process monitor (318) are shown residing external to the memory (308) and are in communication with the operating system. In one embodiment, the policy manager (316) and process monitor (318) may be software elements that reside in memory (308). The access controller (314) monitors an API call resident in each process, and controls a resource access by referring to policy parameters for each process constructed. The policy manager (316) reconstructs policies based on a notification from the process monitor (318) or the window monitor (312), and dynamically updates policy parameters on the shared memory (310). In one embodiment, a policy table (320) is provided in shared memory (308) to track active and inactive policies. At the time of registration, the policy manager (316) evaluates the consistency of a process requesting registration with an existing policy, and permits or denies the policy. Based on the monitoring results from the process monitor (318) and the window monitor (312), the policy manager (316) re-evaluates the policy's application condition and updates the access control policy by dynamically adding or subtracting the policy element of the target process. The policies of all active processes which are influenced are updated at the same time.

Figure 4A:
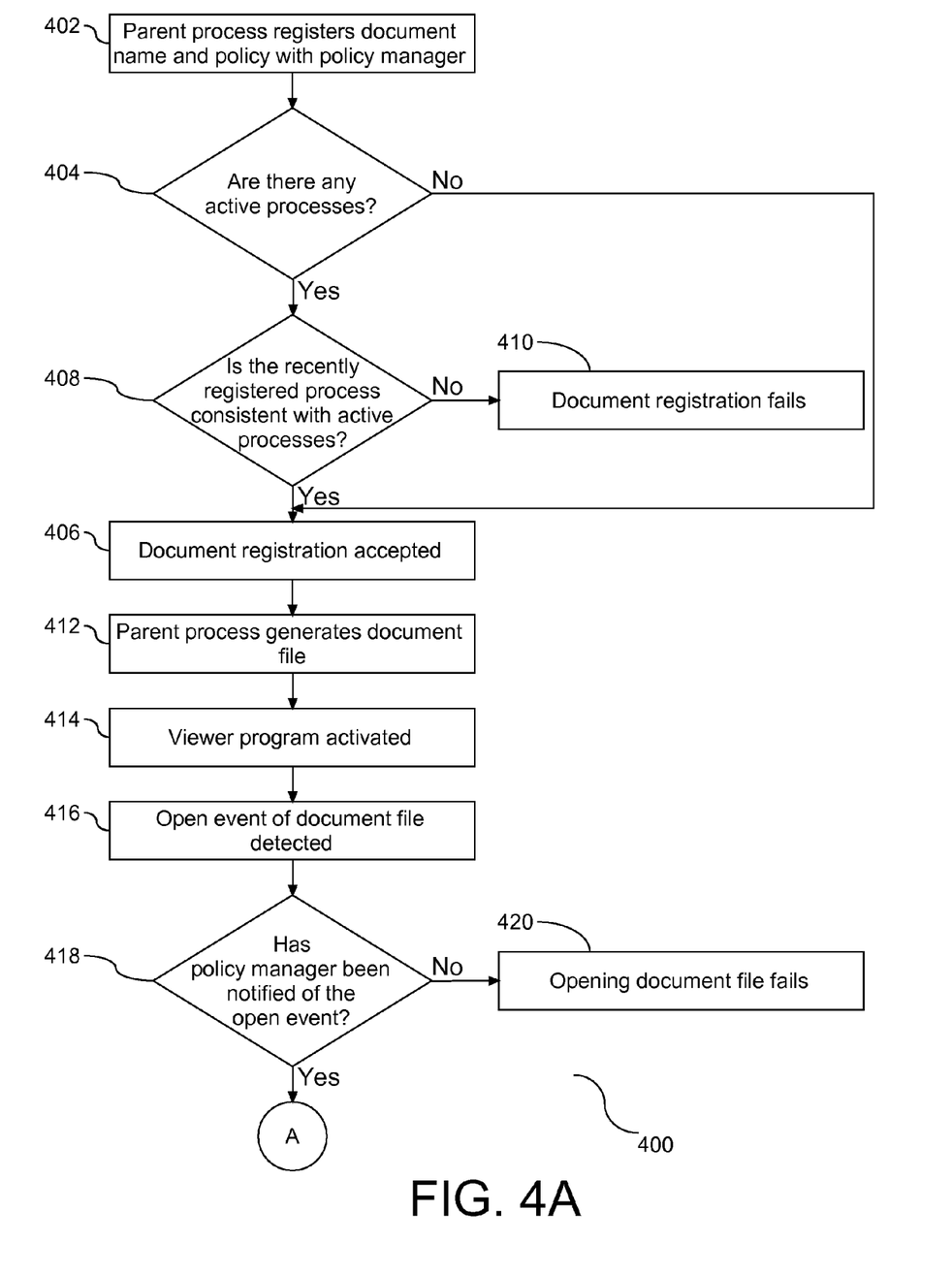
FIGS. 4A and 4B are a flow chart illustrating access control for an application.
Figure 4B:
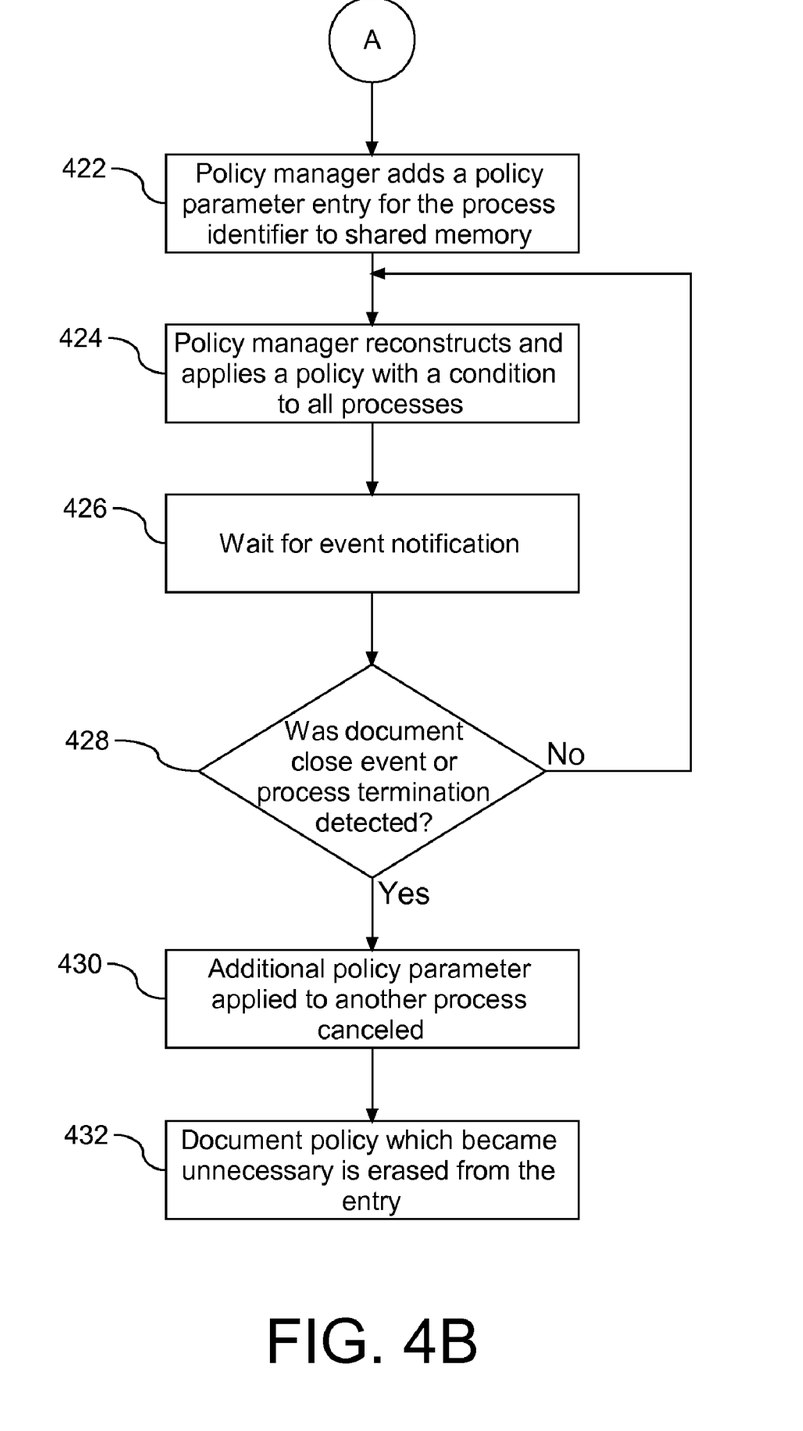

FIGS. 4A and 4B are a flow chart (400) illustrating access control for an MDI application. First, the parent process registers a document name and a policy with the policy manager (402). Thereafter, it is determined if there are any active processes (404). If the response to the determination at step (404) is negative, the process registered at step (402) is accepted (406). However, if the response to the determination at step (404) is positive, a determination is conducted to evaluate the consistency of the process registered at step (402) with an active process (408). If it is determined that the process are inconsistent, then the registration of the new process fails (410). However, if it is determined that the processes are consistent or following step (406), the parent process generates a document file in a specific folder (412). Following step (412) an application program is activated (414). In one embodiment, the application program is a viewer program and the document name is an argument for activation of the application program.

At this time, there may be a case where a new process is activated or a case where a new window is generated and displayed within the existing process. In either situation, an open event of a document file is detected (416), followed by a determination as to whether the policy manager has been notified of the open event (418). If the response to the determination at step (418) is negative, the open of the document file fails (420). In one embodiment, a time duration is applied for the policy manager to receive the notification. If the policy manager is not notified of the open event in the set time duration, then the document open event fails and the policy manager returns an error to the parent process to facilitate deletion of the document file. In contrast, if the response to the determination at step (418) is positive, the policy manager adds a policy parameter entry for the process identifier to a policy table in shared memory (422). The policy manager then applies a policy with a condition to all the processes (424). In one embodiment, the condition is a notification that the process is active. For example, in a graphical user interface application, a window display event is notified following a document open event. When a window display event is notified, the policy manager adds a policy parameter with a condition "window being displayed" to the process and other processes. Similarly, when a window active event is notified, the policy manager adds a policy parameter with the condition "window being active" to the process and other processes. When a window inactive event is notified, the policy parameter with the condition "window being active" is canceled. In a similar manner, when a window un-display event is notified, the policy parameter with the condition "window being displayed" is canceled.

Thereafter, every time an event to be notified occurs according to the user's window operation (426), a determination is conducted as to whether a document close event or a process termination event has been detected (428). If the response to the determination at step (428) is positive, the additional policy parameter applied to other processes is canceled (430) and a document policy which becomes unnecessary will be erased from the entry (432). However, if the response to the determination at step (428) is negative, the policy manager reconstructs and applies the policies of all processes according to the application condition (424) and continues to monitor and manage the active process until the document is closed.

In one embodiment, the invention is implemented in software, which includes but is not limited to firmware, resident software, microcode, etc. The invention can take the form of a computer software product accessible from a computer-usable or computer-readable medium providing program code for use by or in connection with a computer or any instruction execution system. For the purposes of this description, a computer-usable or computer-readable medium can be any apparatus that can contain, store, or communicate, the program for use by or in connection with the instruction execution system, apparatus, or device.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

For the purposes of this description, a computer-useable or computer-readable medium can be any apparatus that can contain, store, or communicate, the program for use by or in connection with the instruction execution system, apparatus, or device.

Advantages Over the Prior Art

The policy management method and system described above provides granular access control associated with graphical user interface statuses. Each parameter of the access control policies is associated with a graphical user interface status. Similarly, each policy parameter is dynamically applied to running processes when the associated graphical user interface event happens, and each policy parameter is cleared after changing its associated graphical user interface status. This allows access control policy to reflect flexible window operations, such as window opening, activating, resizing, closing, etc.

Alternative Embodiments

It will be appreciated that, although specific embodiments of the invention have been described herein for purposes of illustration, various modifications may be made without departing from the spirit and scope of the invention. In particular, the window monitor section may be realized by the general-purpose system of hooking a window message, or may be realized by a plug-in type when an application plug-in is supported. In the latter case, more abundant information, such as full path name or URL of the document file, and a menu operation event can be acquired. Furthermore, a document name to be registered in the document policy list is not limited to a file. Rather, the document name can be any keyword to identify a window. For example, the URL, mail sender/sendee address, window class name, title name, etc., can be designated. Accordingly, the scope of protection of this invention is limited only by the following claims and their equivalents.

We claim:

1. A method for dynamic resource access, comprising:
configuring a computer system with a processor and memory in communication with a policy manager for controlling access of a first process to hardware and software resources within said computer system;
said policy manager evaluating a new access control policy for said first process in response to activation of said first process to determine consistency of said new access control policy with all existing policies for other processes within said computer system;
determining an access control policy for said first process by monitoring activation and termination of processes and graphical user interface events from all running applications;
registering said new access control policy with said policy manager in response to determining that the new control policy is consistent with the existing policies for other processes;
said access control policy defined as a combination of parameters for all processes, said parameters include a local policy parameter applied to the first process, remote policy parameters applied to specific processes different from the first process, and global policy parameters applied to all active processes different from the first process, wherein at least one process is different from the first process executing within said computer system, each parameter associated with a graphical user interface status of one of said processes; and
adjusting each policy parameter in real-time in response to a change in at least one process condition including all graphical user interface events, including events associated with processes different from the first process.

2. The method of claim 1, further comprising applying said parameters to a transition of a graphical user interface related event.

3. The method of claim 2, further comprising dynamically substituting a policy parameter to a registered control policy in response to transition of said graphical user interface related event.

4. The method of claim 2, wherein said graphical user interface related event includes a window modification event selected from the group consisting of: creation, deletion, movement, re-sizing, z-order change, activation, non-activation, and combinations thereof.

5. The method of claim 1, further comprising applying a control policy to said first process when said first process is activated, and canceling a control policy from said first process when said first process is terminated.

6. The method of claim 1, further comprising applying a control policy to the first process when a region of a graphical user interface window is visible or active, and canceling a control policy from said first process when said region of said graphical user interface window is invisible or inactive.

7. The method of claim 1, further comprising the remote policy parameter selectively added and applied to a second process while the local policy parameter for the first process is valid.

8. A computer system comprising:
a processor in communication with memory and a policy manager for controlling access of a first process to hardware and software resources within said computer system;
said policy manager to evaluate a new control policy for a first process in response to activation of said first process, said evaluation to include a determination of consistency of said new policy with all existing policies for other processes within said computer system;
a process manager in communication with said policy manager to monitor activation and termination of processes and graphical user interface events from all running applications and to determine an access control policy for said first process;
said process manager to register said new control policy with said policy manager responsive determination of consistency of said control policy with the existing policies for other processes;
said control policy defined as a combination of parameters for all processes, said parameters include a local policy parameter applied to the first process, remote policy parameters applied to specific processes different from the first process, and global policy parameters applied to all active processes different from the first process, wherein at least one process is different from the first process executing within said computer system, each parameter associated with a graphical user interface status of one of said processes; and
said policy manager to adjust each policy parameter in real-time responsive to a change in at least one process condition including all graphical user interface events, including events associated with processes different from the first process.

9. The system of claim 8, further comprising said policy manager to apply said parameters to a transition of a graphical user interface related event.

10. The system of claim 9, further comprising said policy manager to dynamically substitute a policy parameter to a registered control policy responsive to transition of said graphical user interface event.

11. The system of claim 9, wherein said graphical user interface related event includes a window modification event selected from the group consisting of: creation, deletion, movement, re-sizing, z-order change, activation, non-activation, and combinations thereof.

12. The system of claim 8, further comprising a control policy to be applied to said first process when said first process is activated and to be canceled from said process when said first process is terminated.

13. The system of claim 8, further comprising a control policy to be applied to said first process when a region of a graphical user interface window is visible on a visual display or in an active state, and said policy to be canceled from said first process when a region of said graphical user interface is invisible or inactive.

14. An article comprising:
a computer readable data storage device having computer-readable instructions stored thereon executable by a first processor, said instructions comprising:
instructions to evaluate a new control policy for a first process to be executed within a computer system to determine consistency of said new policy with an existing policy for controlling access of a first process to hardware and software resources within said computer system;

instructions to determine an access control policy for said first process by monitoring activation and termination of processes and graphical user interface events from all running applications;

instructions to register said new control policy with said policy manager in response determining that the control policy is consistent with the existing and registered control policy;

instructions to define said control policy as a combination of parameters for all processes, including at least one process different from the first process, executing within said computer system, each parameter associated with a graphical user interface status of one of said processes, wherein said parameters include a local policy parameter applied to the first process, remote policy parameters applied to specific processes different from the first process, and global policy parameters applied to all active processes different from the first process; and instructions to adjust each policy parameter in real-time in response to a change in at least one process condition including all graphical user interface events, including events associated with processes different from the first process.

15. The article of claim 14, further comprising instructions to apply said parameters to a transition of a graphical user interface related event.

16. The article of claim 15, further comprising instructions to dynamically substitute a policy parameter to a registered control policy in response to transition of said graphical user interface related event.

17. The article of claim 15, wherein said graphical user interface related event includes a window modification event selected from the group consisting of: creation, deletion, movement, re-sizing, z-order change, activation, non-activation, and combinations thereof.

18. The article of claim 14, further comprising instructions to apply a control policy to said first process when said first process is activated, and canceling a control policy from said first process when said process is terminated.

19. The article of claim 14, further comprising instructions to apply a control policy to said first process when a region of a graphical user interface window is visible or active, and canceling a control policy from said first process when said region of a graphical user interface window is invisible or inactive.

20. The article of claim 14, further comprising the remote policy parameter selectively added and applied to a second process while the local policy parameter for the first process is valid.

* * * * *